(12) United States Patent
Killy

(10) Patent No.: US 11,878,727 B2
(45) Date of Patent: Jan. 23, 2024

(54) SHOPPING CART AND ASSOCIATED METHODES

(71) Applicant: Rosemonde W. Killy, Windermere, FL (US)

(72) Inventor: Rosemonde W. Killy, Windermere, FL (US)

( * ) Notice: Subject to any disclaimer, the term of this patent is extended or adjusted under 35 U.S.C. 154(b) by 18 days.

(21) Appl. No.: 17/543,158

(22) Filed: Dec. 6, 2021

(65) Prior Publication Data
US 2022/0289262 A1    Sep. 15, 2022

Related U.S. Application Data

(62) Division of application No. 17/197,590, filed on Mar. 10, 2021, now Pat. No. 11,305,801.

(51) Int. Cl.
| | | |
|---|---|---|
| *B62B 3/02* | (2006.01) | |
| *B62B 3/18* | (2006.01) | |
| *B62B 3/14* | (2006.01) | |

(52) U.S. Cl.
CPC ............... *B62B 3/18* (2013.01); *B62B 3/022* (2013.01); *B62B 3/1492* (2013.01)

(58) Field of Classification Search
CPC ........... B62B 3/18; B62B 3/182; B62B 3/022; B62B 3/02; B62B 3/027
See application file for complete search history.

(56) References Cited

U.S. PATENT DOCUMENTS

| | | | |
|---|---|---|---|
| 9,126,610 B1* | 9/2015 | Abiri ...................... | B62B 3/027 |
| 9,573,610 B1* | 2/2017 | Chaturvedi ............. | B62B 3/005 |
| 11,059,508 B1* | 7/2021 | Byrd ....................... | B62B 5/065 |
| 2002/0167139 A1* | 11/2002 | Prather ................... | B62B 3/142 |
| | | | 280/47.35 |
| 2012/0274052 A1* | 11/2012 | Zhu ......................... | B62B 3/027 |
| | | | 280/651 |
| 2014/0183844 A1* | 7/2014 | Iryami .................... | B62B 3/022 |
| | | | 280/659 |
| 2018/0258965 A1* | 9/2018 | Danko ..................... | E05D 7/10 |

* cited by examiner

*Primary Examiner* — Brian L Swenson

(57) ABSTRACT

The cart may include a plurality of fastening members attached to the outer frame of at least one of the first side panel, second side panel, front panel and end panel. Additionally, there may be a plurality of rotational members attached to the outer frame of at least one of the first side panel, second side panel and front panel. At least one of the first side panel, second side panel, and front panel are removably attached to the cart via at least one of the first side panel, second side panel, front panel, and end panel that itself may be rotatable, removable, or both. Some embodiments include a kit for converting a standard shopping cart to an improved shopping cart. Some embodiments include the improved cart as a flat bed shopping cart with up to three downwardly foldable panels.

6 Claims, 14 Drawing Sheets

SHOPPING CART AND ASSOCIATED METHODES

RELATED APPLICATIONS

This is a divisional patent application based upon and claiming the priority of U.S. Non-Provisional patent application Ser. No. 17,197,590, titled "Improved Shopping Cart and Associated Methods", filed on Mar. 10, 2021, now pending. The disclosures of the aforementioned application are hereby incorporated by reference in their entireties in this patent application.

This application claims the benefit under 35 U.S.C. § 119(e) of U.S. Provisional Patent Application Ser. No. 63/100,493 titled ". . . a shopping cart having one, two, or three side panels fold down 180 degrees . . . " filed on Mar. 16, 2020, the entire contents of which are incorporated herein by reference.

FIELD OF THE INVENTION

The present invention relates to systems and methods for loading and unloading goods into a shopping cart. More particularly, the present invention relates to a structurally improved shopping cart and associated methods.

BACKGROUND

The traditional metal, plastic, and plastic-hybrid framed shopping cart is used by millions of people worldwide to accumulate their goods while shopping as well as to unload their goods into their vehicle. Loading goods into the shopping cart requires the consumer to hoist them over top of the side panel of the cart and drop the goods into the cart bin. For heavier items, the traditional shopping cart requires the consumer to bend over and place them on the rack under the cart.

Unloading the goods is equally burdensome requiring the user to bend over the side panels, reach into the cart, and hoist the goods out from overtop of the panels. Loading and unloading heavy items such as milk gallons and large packs of water into the shopping cart becomes problematic for a large segment of the public.

There exists a need in the art for an improved shopping cart and associated methods.

This background is provided to reveal information believed by the applicant to be of possible relevance to the present invention. No admission is made as to prior art and nothing within the background should be construed as prior art against the present invention.

SUMMARY OF THE INVENTION

Embodiments of the invention are directed to an improved shopping cart including a first side panel, a second side panel, a bottom panel, a front panel and front panel with a plurality of fastening members attached to the outer frame of at least one of the first side panel, second side panel, front panel and front panel. It may include a plurality of rotation facilitating members attached to the outer frame of at least one of the first side panel, second side panel and front panel. At least one side of the first side panel, second side panel, and front panel are removably attached to at least one of the first side panel, second side panel, front panel, and front panel. Furthermore, at least one of the first side panel, second side panel, and front panel are at least one of rotatable and removable with respect to the improved shopping cart.

In some embodiments, the first side panel and second side panel are fixed and the front panel is rotatable along closed bottom hooks fixed around a bottom frame of the shopping cart. Furthermore, the front panel upper frame is removably attached to the first side panel and second side panel via the flat surface of a magnet fixedly attached to an upper end of the first side panel and second side panel respectively.

In some embodiments, the first side panel and second side panel are fixed and the front panel is rotatable along a bottom coil. Furthermore, the front panel may be removably attached to the first side panel and second side panel via the flat surface of a magnet attached to the upper end of the first side panel and second side panel respectively.

In some embodiments, the first side panel and second side panel are fixed and the front panel is rotatable along a plurality of bottom magnets. Additionally, the front panel may be removably attached to the first side panel and second side panel via the flat surface of a magnet attached to the upper end of the first side panel and second side panel respectively.

In some embodiments, the first side panel and second side panel are fixed and the front panel is rotatable along a plurality of bottom magnets. In this embodiment, the front panel may be removably attached to the first side panel and second side panel via the flat surface of a magnet attached to the upper end of one of the first side panel and second side panel. The front panel may be removably attached to an upper clamp on the upper end of one of the first side panel and second side panel.

In some embodiments, the first side panel and second side panel are fixed and the front panel is rotatable along a plurality of cylinder magnets fixedly attached to one of the first side panel and second side panel. Furthermore, the front panel is structured to swing open and closed along the arced surface of the plurality of cylinder magnets. Additionally, the front panel may be removably attached to one of the first side panel and second side panel via a plurality of flat faced magnets fixedly attached thereon.

In some embodiments, the first side panel and second side panel are fixed and the front panel is rotatable along at least one hinge fixedly attached to one of the first side panel and second side panel. Furthermore, the front panel may be structured to swing open and closed using the at least one hinge. Also, the front panel may be removably attached to one of the first side panel and second side panel via a plurality of flat faced magnets fixedly attached thereon.

In some embodiments, the first side panel and second side panel are fixed and the front panel is rotatable along at least one hinge fixedly attached to one of the first side panel and second side panel. Furthermore, the front panel is configured to swing open and closed using the at least one hinge. Also, the front panel may be removably attached to one of the first side panel and second side panel via a plurality of flat faced magnets fixedly attached thereon.

In some embodiments, the first side panel and second side panel are fixed and the front panel includes a plurality of magnetized panes rotatable along at least one hinge fixedly attached to one of the first side panel and second side panel. Furthermore, the front panel may be structured to swing open and closed using the at least one hinge. Also, the front panel may be removably attached to one of the first side panel and second side panel via magnetic attraction between the magnetized panes and one of the first side panel and second side panel.

In some embodiments, the first side panel and second side panel are fixed and the rotation facilitating members are replaced by an front panel comprised entirely of a plurality of removable magnetized panes.

In some embodiments, at least one of the first side panel and second side panel are fixed. Furthermore, in this embodiment the end panel may be fixed. Also, at least one of the first side panel and second side panel are rotatable by at least one of bottom magnets, a bottom coil, bottom hinges, and closed loops fixed on a bottom frame of the improved shopping cart. Additionally, at least one of the first side panel and second side panel may be removably attached via upper flat facing magnets.

Other embodiments of the invention include an improved shopping cart comprising a first side panel, a second side panel, a front panel and end panel. It may also include a plurality of fastening members attached to the outer frame of the first side panel, second side panel, front panel and end panel. Furthermore, a plurality of rotation facilitating members may be attached to the bottom frame of the improved shopping cart. The first side panel, second side panel, and front panel may be removably attached to at least one of the first side panel, second side panel, front panel, and end panel via magnets fixedly attached to an upper portion of the first side panel, second side panel, front panel, and end panel. Additionally, the first side panel, second side panel, and front panel are rotatable along bottom rotational members.

In some embodiments, the upper magnets are fixed to vertical side ends of the first side panel, second side panel, front panel, and end panel. The upper magnets may be structured with a plurality of flat face surfaces to accommodate removably attaching the first side panel, second side panel and front panel respectively.

In some embodiments, at least one of the first side panel, second side panel, and front panel are comprised entirely of magnetized panes that replace the rotation facilitating members.

In some embodiments, the rotation facilitating members are comprised of at least one of bottom magnets, a bottom coil, bottom hinges, and closed loops fixed on a bottom frame of the improved shopping cart.

Other embodiments of the present invention include a shopping cart improvement kit including a plurality of magnets, a plurality of fasteners, a shopping cart panel, and a plurality of magnetized panes. The magnets, fasteners, front panel, and magnetized panes may be structured to fit into a container. Some embodiments may have the kit further including bolt cutters.

Some embodiments of the improvement kit may include the shopping cart panel with front panel including a pair of interior end loops structured to accommodate the horizontally oriented upper frame of the first side panel and second side panel. Also, the front panel may include a pair of exterior end loops structured as handles to facilitate removably engaging the front panel with the first side panel and second side panel.

Some embodiments may include the improvement kit with the plurality of magnets comprised of at least one of flat facing magnets with interior voids and cylinder magnets with interior voids.

Some embodiments of the improvement kit may include the plurality of fasteners with at least one of a receiving hook and a clamp and some further include a bottom coil.

DETAILED DESCRIPTION OF THE INVENTION

Figure 1A:
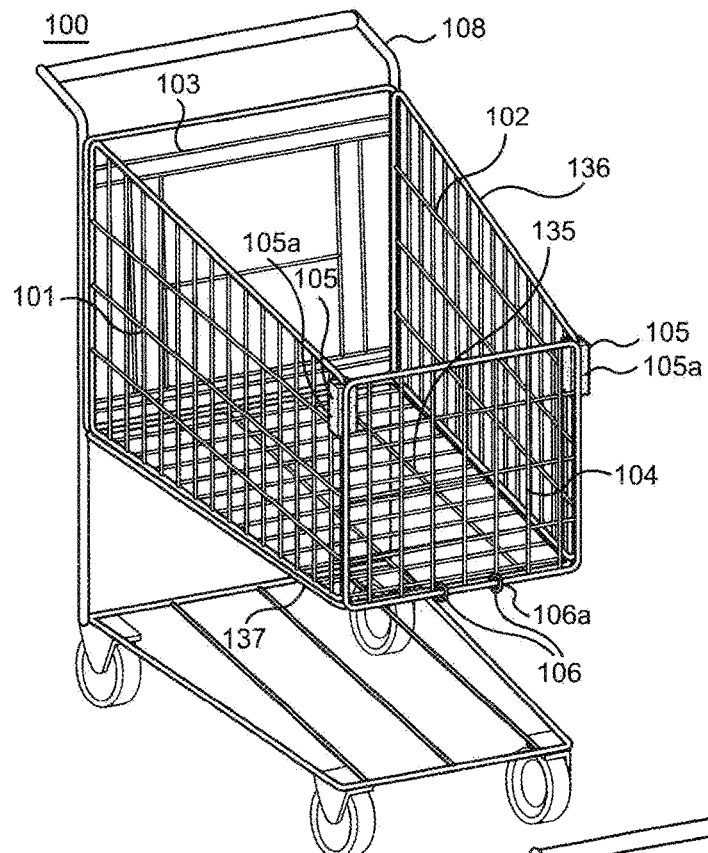
FIG. 1A is a front perspective view of the improved shopping cart with adjustable front panel illustrated in a closed position according to an embodiment of the invention.

The present invention will now be described in detail with reference to the accompanying drawings. The embodiment descriptions are illustrative and not intended to be limiting in any way. Other embodiments of the invention will readily suggest themselves to persons with ordinary skill in the art after having the benefit of this disclosure. Accordingly, the following embodiments are set forth without any loss of generality and without imposing limitation upon the claimed invention.

Directional terms such as "top" "bottom" "right" "left" and other like terms are used for the convenience of the reader in reference to the drawings. Additionally, the description may contain terminology to convey position, orientation, and direction without departing from the principles of the present invention. Such positional language should be taken in context with the represented drawings.

Quantitative terms such as "generally" "substantially" "mostly" and other like terms are used to mean that the referred object, characteristic, or quality constitutes a majority of the referenced subject. Likewise, use of the terms such as first and second do not necessarily designate a limitation of quantity. Such terms may be used as a method of describing the presence of at least one of the referenced elements or may provide a means of differentiating orientation. The meaning of any term within this description is dependent upon the context within which it is used, and the meaning may be expressly modified.

Referring to Fla 1A, an improved shopping cart, hereinafter the cart 100, will be described in more detail. The cart 100 may include a bottom bed panel 135 perpendicular to, and surrounded by a first side panel 101, a second side panel 102, a front panel 104 and an end panel 103. A cart handle 108 may extend distally from an end portion of the cart 100 proximate the end panel 103.

In one embodiment the cart 100 may include a rotational front panel 104 that may rotate along at least one of the front panel's 104 frame axes utilizing a plurality of rotation facilitating members 106. In this embodiment, the rotation facilitating members 106 may be a plurality of closed loops 106a that encircle both a lower frame axis of the front panel 104 and a portion of the frame of the inside bed panel 135 proximate thereto.

The front panel 104 may be removably attached to the cart bed top 136 via a plurality of fastening members 105. In this embodiment, the fastening members 105 may be a plurality of upper block magnets 105a fixedly attached to the first side panel 101 and the second side panel 102 respectively. The magnets may be of Neodymium, Alnico, Ceramic or Cobalt and in some embodiments may include a coating made of plastic, zinc, or the like. The cart front panel 104 may be magnetically and removably attached via the attraction between the metal frame of the front panel 104 and the upper block magnets 105a. Therefore, the cart 100 may transition from a closed position as depicted in FIG. 1A to an open position such as the one depicted in FIG. 1B when the front panel 104 is removed from the cart bed top 136 and is swung down via the closed loops 106a to an arced range of 180 degrees or more below the cart bed bottom 137. In this embodiment, the first side panel 101, the second side panel 102, and end panel 103 may be fixed in non-rotatable positions. As will be shown and described in FIGS. 6A and 6E hereinafter, types of magnets that may be used with the improved cart 100 may vary depending on need, preference and circumstance. These magnets may include semicylindrical magnets 623 with a bar attachment channel and channel, cylinder, or block magnets 624 with a bar attachment channel 625. These magnets 623, 624 may be structured to easily fit on the bars of a cart 100. Therefore, these magnets may be used to easily convert a traditional shopping cart to an improved cart 100.

Figure 1B:
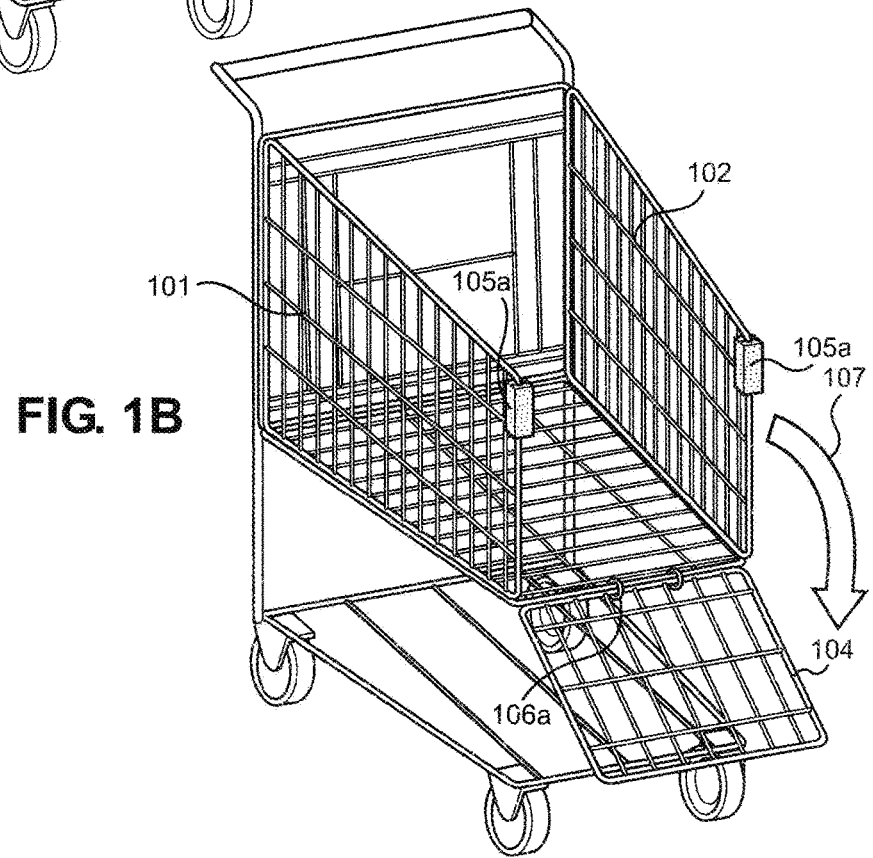
FIG. 1B is a front perspective view of an improved shopping cart with end panel opened from the panel top and attached at the panel bottom by bottom closed loops according to an embodiment of the invention.

FIG. 1B shows the cart 100 in the open position with the front panel 104 removed from the fastening members 105 and hanging below the cart bed bottom 137 by the closed loops 106a. The rotational direction 107 of the front panel 104 is shown indicating the front panel 104 may include an arced swing pattern distal to the cart 100 when transitioning from an open to closed position.

Figure 1C:
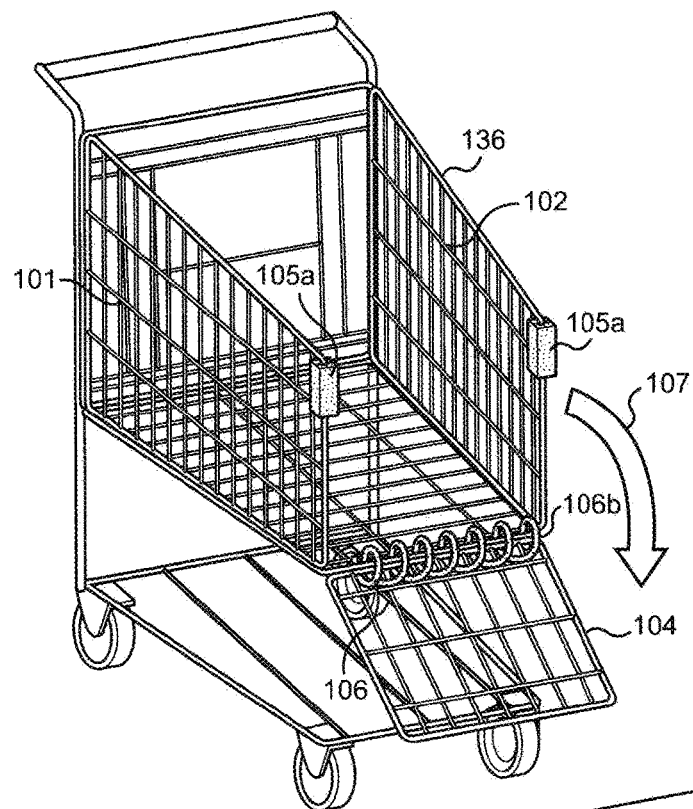
FIG. 1C is a front perspective view of an improved shopping cart with end panel opened from the panel top and attached at the panel bottom by a bottom coil according to an embodiment of the invention.

FIG. 1C illustrates another embodiment of the invention whereby the rotation facilitating member 106 may be a coil 106b. The coil 106b may be made of any number of durable and malleable material that may wrap around a lower frame axis of the front panel 104 and a portion of the frame of the inside bed panel 135 proximate thereto. The coil 106b material may be at least one of spiraled metal, plastic, metal coated with plastic, fiber, hybrid thereof, and the like.

In this embodiment, the cart 100 may transition from a dosed position as depicted in FIG. 1A to an open position. This may happen when the front panel 104 is removed from upper block magnets 105a on the ends of the first and second side panels 101, 102 at the cart bed top 136 and is swung along the indicated rotational direction 107 via the coil 106b. This may be an arced range of 180 degrees or more below the cart bed bottom 137. In this embodiment, the first side panel 101, the second side panel 102, and end panel 103 may be fixed in non-rotatable positions.

Figure 1D:
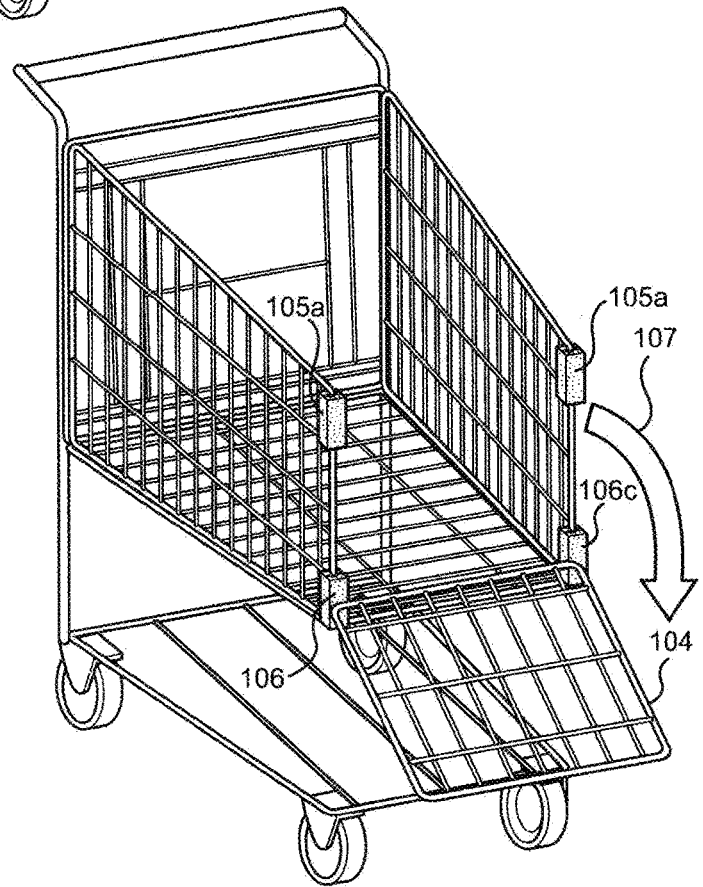
FIG. 1D is a front perspective view of an improved shopping cart with end panel opened from the panel top and attached at the panel bottom by a plurality of magnets according to an embodiment of the invention.

FIG. 1D shows an embodiment of the invention whereby the rotation facilitating members 106 may be a plurality of lower block magnets 106c fixedly attached to lower portions of the first side panel 101 and the second side panel 102 respectively positioned proximate the front of the inside panel 135. The fastening members 105 may be a plurality of upper block magnets 105a. Although not shown in FIG. 1D magnets can also be positioned under the end of the base panel 137.

In this embodiment, the cart 100 may transition from a closed position as depicted in FIG. 1A to an open position when the front panel 104 is removed from the cart bed top 136 and is swung down along the indicated rotational direction 107 via the lower block magnets 106c to an arced range of 180 degrees or more below the cart bed bottom 137. In this embodiment, the first side panel 101, the second side panel 102, and end panel 103 may be fixed in non-rotatable positions.

In this particular embodiment, the front panel 104 may be removed in its entirety from the end of the cart 100. The front panel 104 may be repositioned back to its original closed orientation, or may be positioned so that only a single side of the front panel 104 is attached to the cart as indicated by the opened position in FIG. 1D.

Figure 2A:
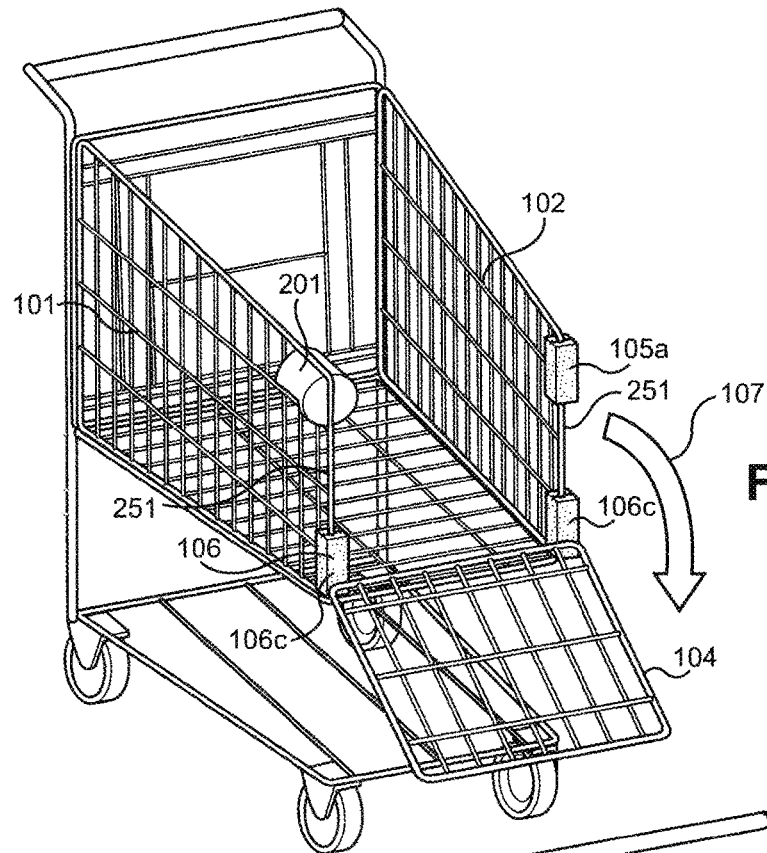
FIG. 2A is a front perspective view of an improved shopping cart with end panel opened from the panel top and attachable by a top clip that is attached at the panel bottom by a plurality of magnets according to an embodiment of the invention.

FIG. 2A illustrates an embodiment whereby the rotation facilitating members 106 may be a plurality of lower block magnets 106c fixedly attached to lower portions of the first side panel 101 and the second side panel 102 proximate the end of the inside panel 135. The fastening members 105 may include at least one upper block magnet 105a and one upper clamp 201 attached to either of the first side panel 101 and the second side panel 102. In the depicted embodiment, the upper block magnet 105a is shown on the second side panel 102 and the upper clamp 201 on the first side panel 101. However, one skilled in the art will appreciate that the upper block magnet 105a and the upper damp 201 may be oppositely positioned whereby the upper damp 201 is on the second side panel 102 and the upper block magnet 105a is on the first side panel 101.

The upper damp 201 may be bifurcated into two halves, each fixedly attached around an upper portion of the first side panel 101 longitudinally and adhered to each other to form a single upper damp 201. The upper damp 201 may include a groove structured to receive a side frame portion of the front panel 104 to removably secure it thereto. This is in addition to the magnetic securing ability of the upper block magnet 105a on the opposing side panel.

In either embodiment, the cart 100 may transition from a dosed position as depicted in FIG. 1A to an open position when the front panel 104 is removed from the cart bed top 136 and is swung down along the indicated rotational direction 107 via the lower block magnets 106c to an arced range of 180 degrees or more below the cart bed bottom 137. In this embodiment, the first side panel 101, the second side panel 102, and end panel 103 may be fixed in non-rotatable positions.

Like other embodiments, the front panel 104 may be removed in its entirety from the end of the cart 100. The front panel 104 may be repositioned back to its original closed orientation, or may be positioned so that only a single side of the front panel 104 is attached to the cart as indicated by the opened position in FIG. 2A.

Figure 2B:
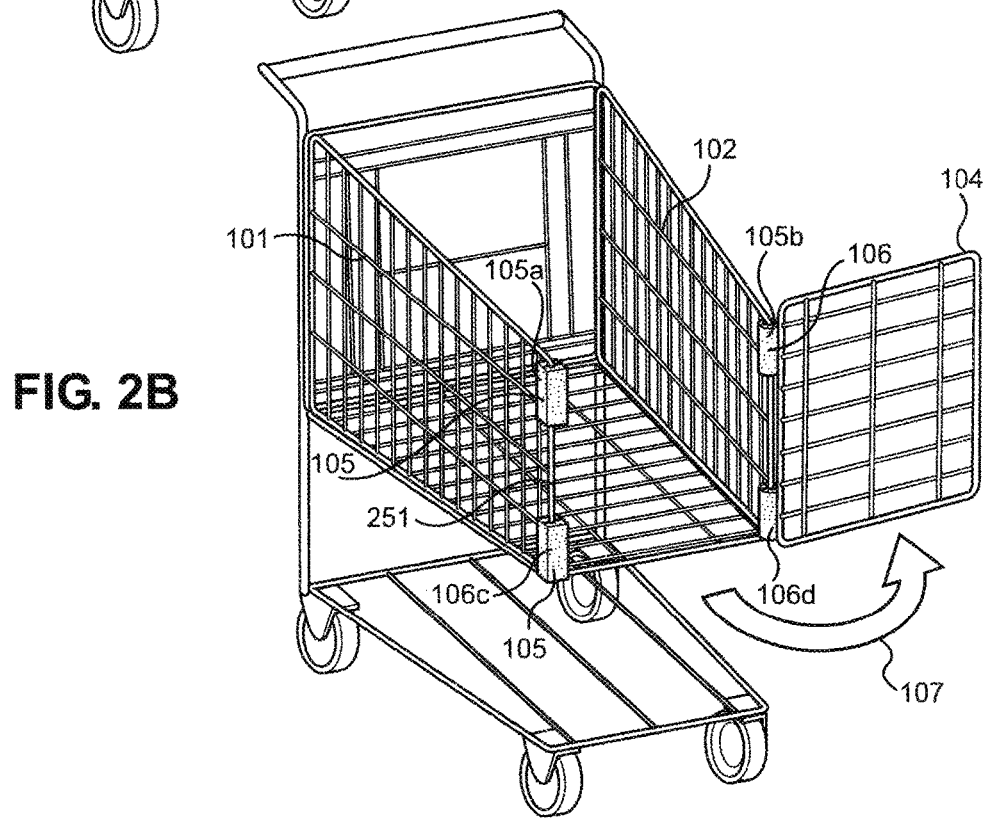
FIG. 2B is a front perspective view of the improved shopping cart with front panel opened from the side and attached by a plurality of side magnets according to an embodiment of the invention.

FIG. 2B illustrates an embodiment whereby the rotation facilitating members 106 may be a plurality of cylinder magnets including an upper cylinder magnet 105b and a lower cylinder magnet 106d both fixedly attached to either the first side panel 101 or the second side panel 102. The front panel 104 may rotate from a closed position to an open position along the arced surface of the cylinder magnets 105b, 106c. Therefore, the front panel 104 may be structured to rotate along the rotational direction 107 to an angle of 270 degrees, enabling the front panel 104 to be flush with the outside of the respective first or second side panel 101, 102 hosting the respective cylinder magnets 105b, 106c.

In this embodiment, the front panel 104 may be removably engaged with the side panel that does not include the cylinder magnets 105b, 106c via a plurality of block magnets. As shown, the first side panel 101 may include an upper block magnet 105a and a lower block magnet 106c structured to receive the side frame of the front panel 104. One skilled in the art will appreciate that the block magnets 105a, 106c may be positioned on either side panel 101, 102 depending on the positioning of the cylinder magnets 105b, 106c as well as preference, need, and circumstance. In this embodiment, the first side panel 101, the second side panel 102, and end panel 103 may be fixed in non-rotatable positions.

Figure 2C:
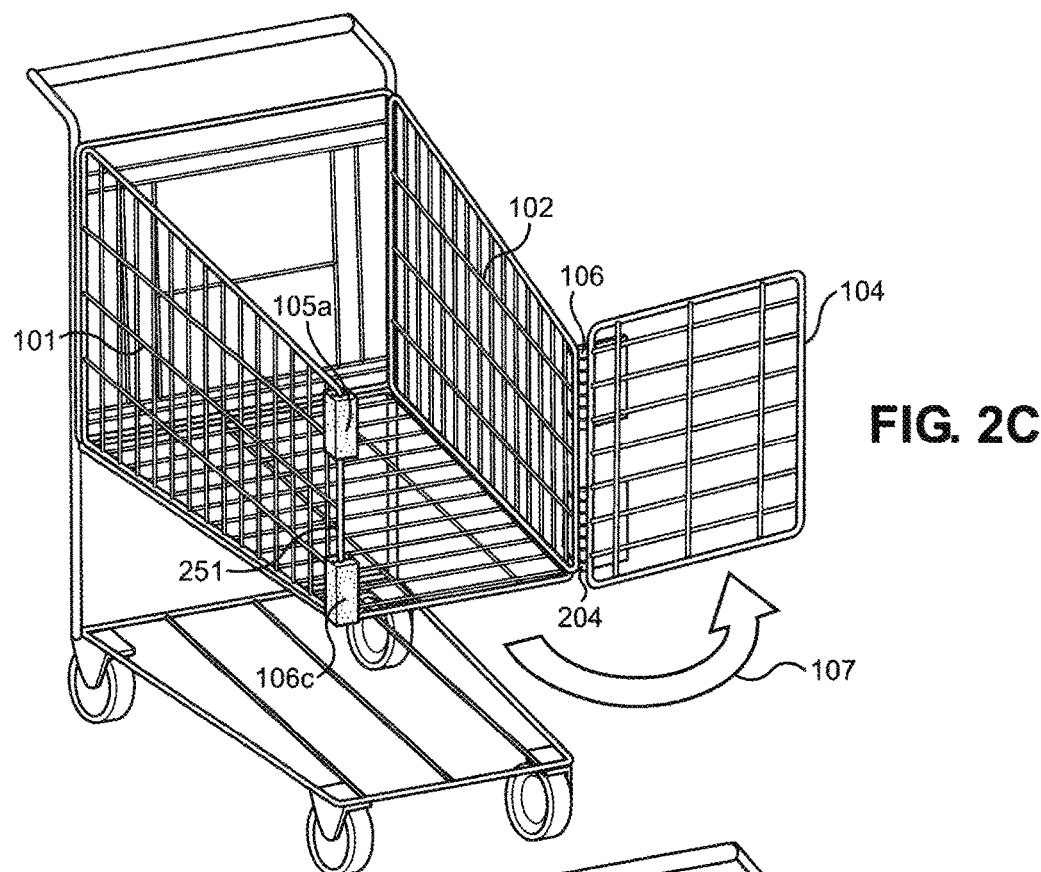
FIG. 2C is a front perspective view of the improved shopping cart with front panel opened from the side and attached by a plurality of side hinges according to an embodiment of the invention.
Figure 2D:
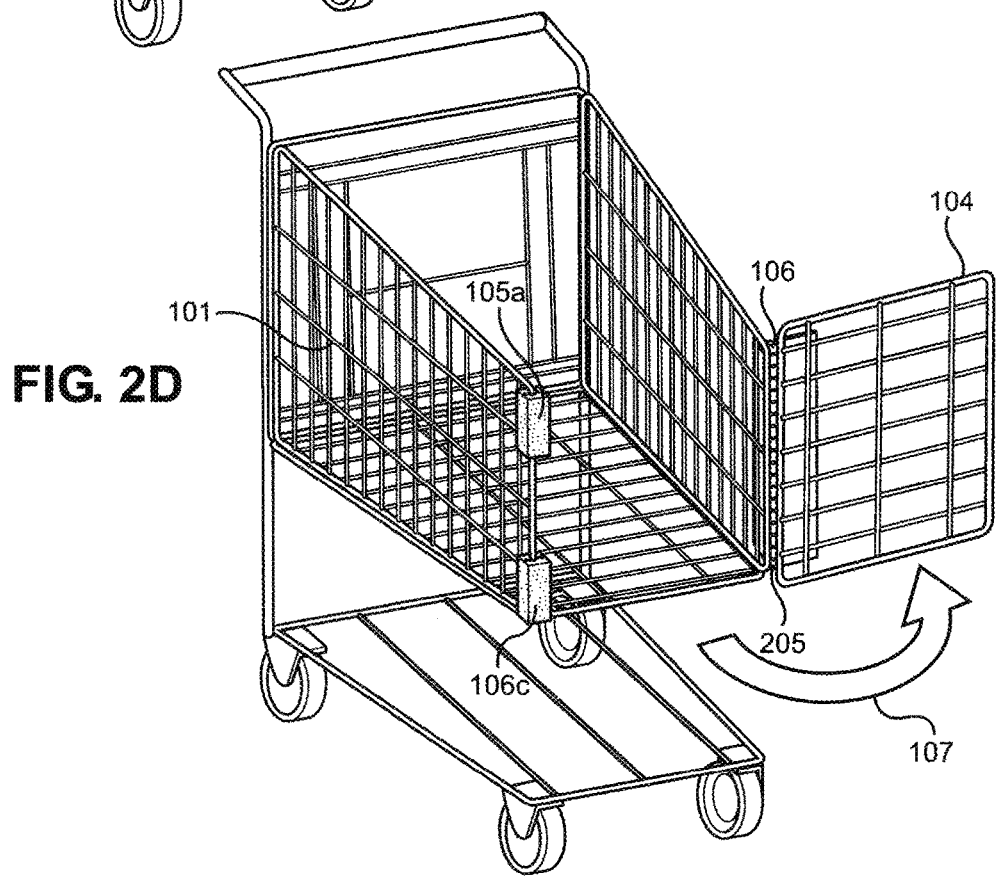
FIG. 2D is a front perspective view of the improved shopping cart with front panel opened from the side and attached by a single side hinge according to an embodiment of the invention.

FIGS. 2C and 2D include embodiments whereby the rotation facilitating members 106 may be either a plurality of side hinges 204 as in FIG. 2C or a single elongate hinge 205 as shown in FIG. 2D. In either embodiment, the front panel 104 may be fixedly attached to its respective side panel 101, 102 and swing open along the rotational direction 107 to an angle of 270 degrees, enabling the front panel 104 to be flush with the outside of the respective first or second side panel 101, 102 hosting the respective elongate hinge 205 or side hinges 204.

In this embodiment, the front panel 104 may be removably engaged with the side panel that does not include the elongate hinge 205 or side hinges 204 via a plurality of block magnets. As shown, the first side panel 101 may include an upper block magnet 105a and a lower block magnet 106c structured to receive the side frame of the front panel 104. One skilled in the art will appreciate that the block magnets 105a. 106c may be positioned on either side panel 101, 102 depending on the positioning of the hinges as well as preference, need, and circumstance. In this embodiment, the first side panel 101, the second side panel 102, and end panel 103 may be fixed in non-rotatable positions.

Figure 3A:
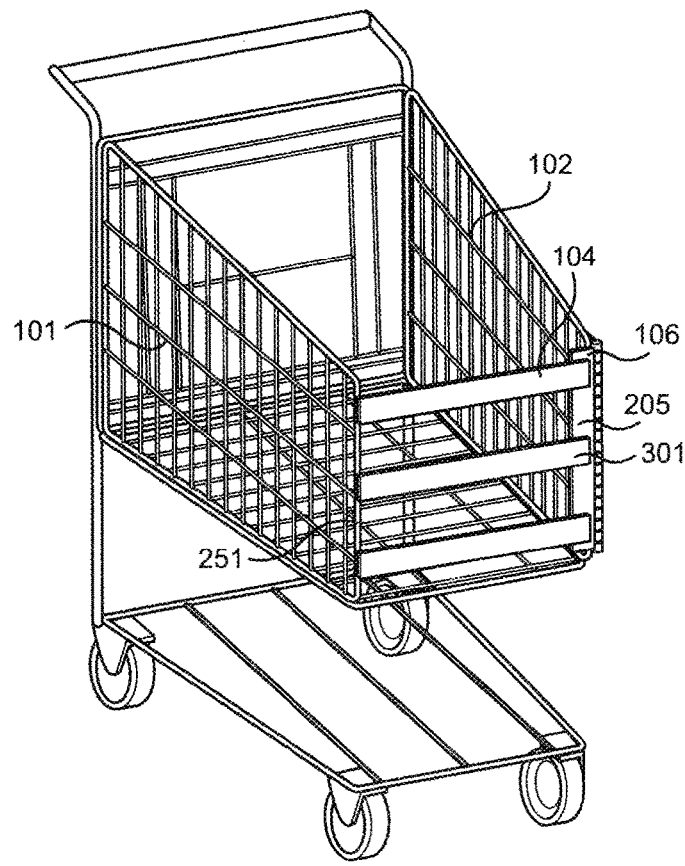
FIG. 3A is a front perspective view of the improved shopping cart with front panel consisting of magnetic panes attached to a side hinge in the closed position according to an embodiment of the invention.

FIG. 3A illustrates an embodiment whereby the front panel 104 is comprised of a plurality of magnetized panes 301 fixedly attached to a rotational member 106 at the front of a side panel 101, 102, and magnetically attached to the opposing side panel 101, 102 via attraction with an upright frame portion of an opposing side panel 101, 102. The upright frame portion may be defined as a receiving bar 251. In some embodiments, the receiving bar 251 itself may be magnetized to facilitate removably engaging with the magnetized panes 301. In any embodiment, the front panel 104 may rotate from a closed position to an open position of 270 degrees and flush with the outside of the respective first or second side panel 101, 102 hosting the respective rotational member 106. In this embodiment, the rotational member 106 is depicted as a single elongate hinge 205. However, one skilled in the art will appreciate that the hinge may be a plurality of side hinges 204.

Figure 3B:
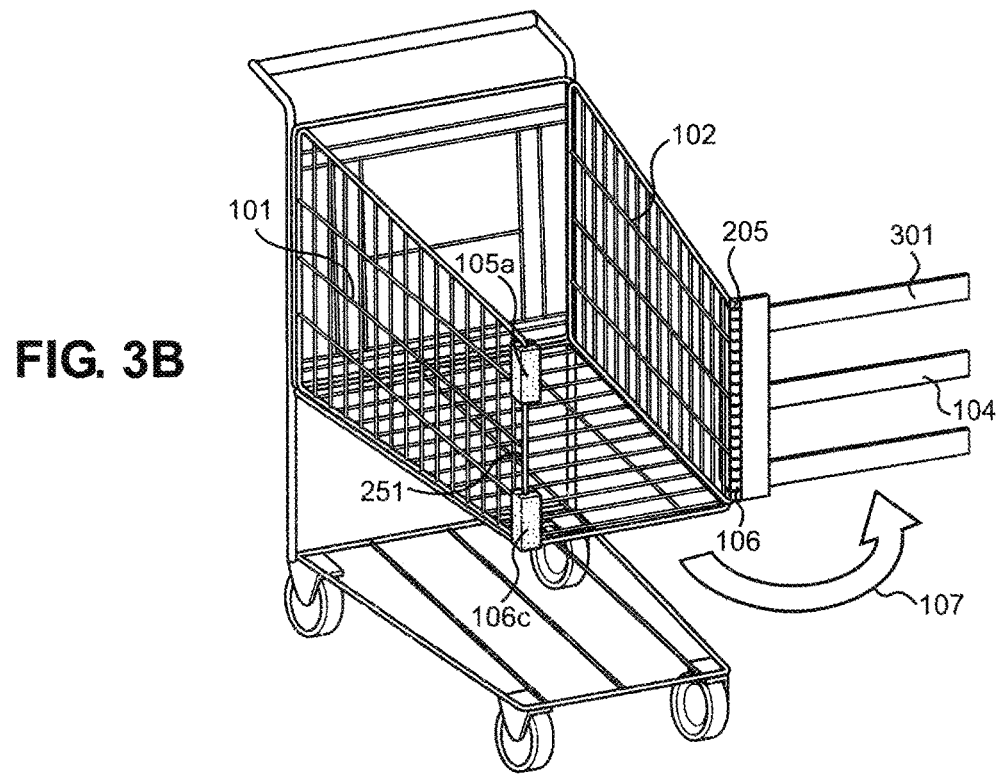
FIG. 3B is a front perspective view of the improved shopping cart with front panel consisting of magnetic panes attached to a side hinge in the open position according to an embodiment of the invention.

FIG. 3B shows a similar embodiment whereby the front pan& 104 may be removably engaged with a side panel 101, 102 via an upper block magnet 105a and a lower block magnet 106c fixedly attached to the receiving bar 251. Similar to FIG. 3A, the front panel 104 may rotate from a closed position to an open position of 270 degrees and flush with the outside of the respective first or second side panel 101, 102 hosting the respective rotational member 106. In this embodiment, the rotational member 106 is depicted as a single elongate hinge 205. However, one skilled in the art will appreciate that the hinge may be a plurality of side hinges 204. In this figure as well as FIG. 3A, the first side panel 101, the second side panel 102, and end panel 103 may be fixed in non-rotatable positions.

Figure 3C:
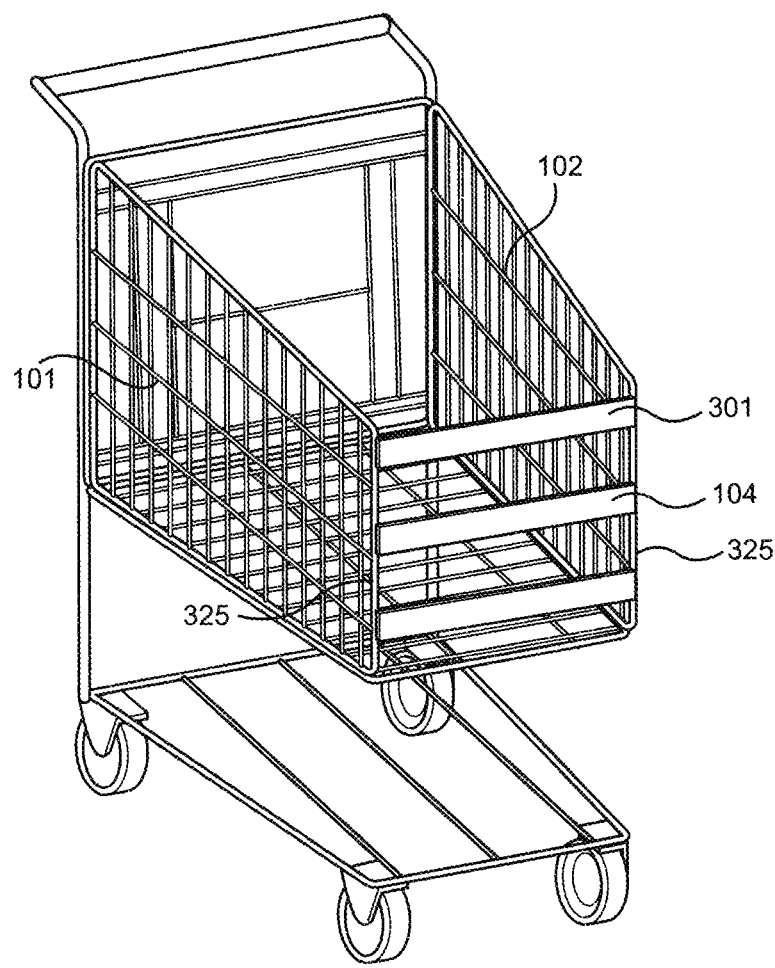
FIG. 3C is a front perspective view of the improved shopping cart with front panel consisting of magnetic panes only in the closed position according to an embodiment of the invention.

FIG. 3C illustrates an embodiment whereby the rotational members 106 are replaced by an front panel 104 comprised entirely of a plurality of removable magnetized panes 301. In this embodiment, the magnetized panes 301 may removably engage the upright end portions of the first and second side panels 101, 102. In some embodiments, the upright end portions 325 themselves may be magnetized to facilitate the temporary securement of the magnetized panes 301. In any embodiment, the magnetized panes 301 may be removed in their entirety to expose the entire end of the cart 100, or certain magnetized panes 301 may be removed to provide an end barrier with a lower height. In any embodiment, the entire pane 301 may be magnetized enabling it to be stored and removably attached to one of the side panels 101, 102 while not being used as a front panel 104.

Figure 4A:
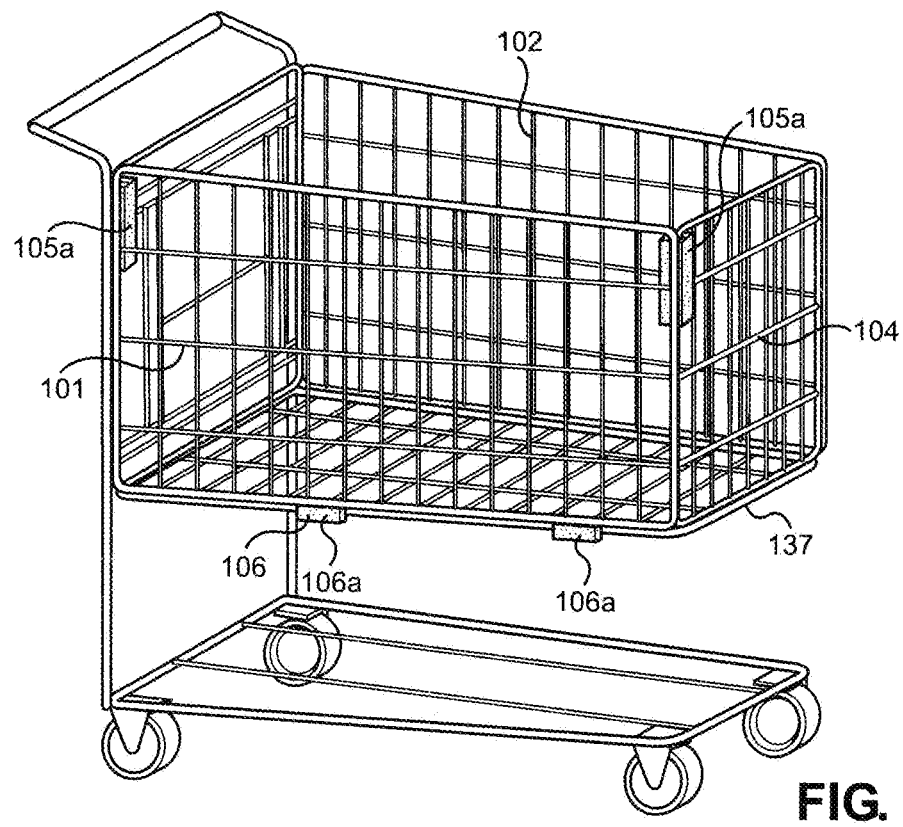
FIG. 4A is a side perspective view of the improved shopping cart with adjustable side panel illustrated in a closed position according to an embodiment of the invention.

FIG. 4A shows an embodiment whereby at least one of the side panels 101, 102 is rotatable and removable with respect to the cart 100. In this embodiment, the rotation facilitating members 106 may be a plurality of lower closed loops 106a fixedly attached to lower portions of the rotatable side panel 101, 102 and a portion of the cart bed bottom 137. The fastening members 105 may be a plurality of upper block magnets 105a fixedly attached to the side frame of the end panel 103 and front panel 104 proximate the rotatable side panel 101,102.

In this embodiment, the cart 100 may transition from a closed position to an open position when the side panel 101 is removed from the cart bed top 136 and is swung down along the indicated rotational direction 107 via lower closed loops 106a to an arced range of 180 degrees or more below the cart bed bottom 137. The remaining panels without rotational members 106 may be fixed in non-rotatable positions.

Figure 4B:
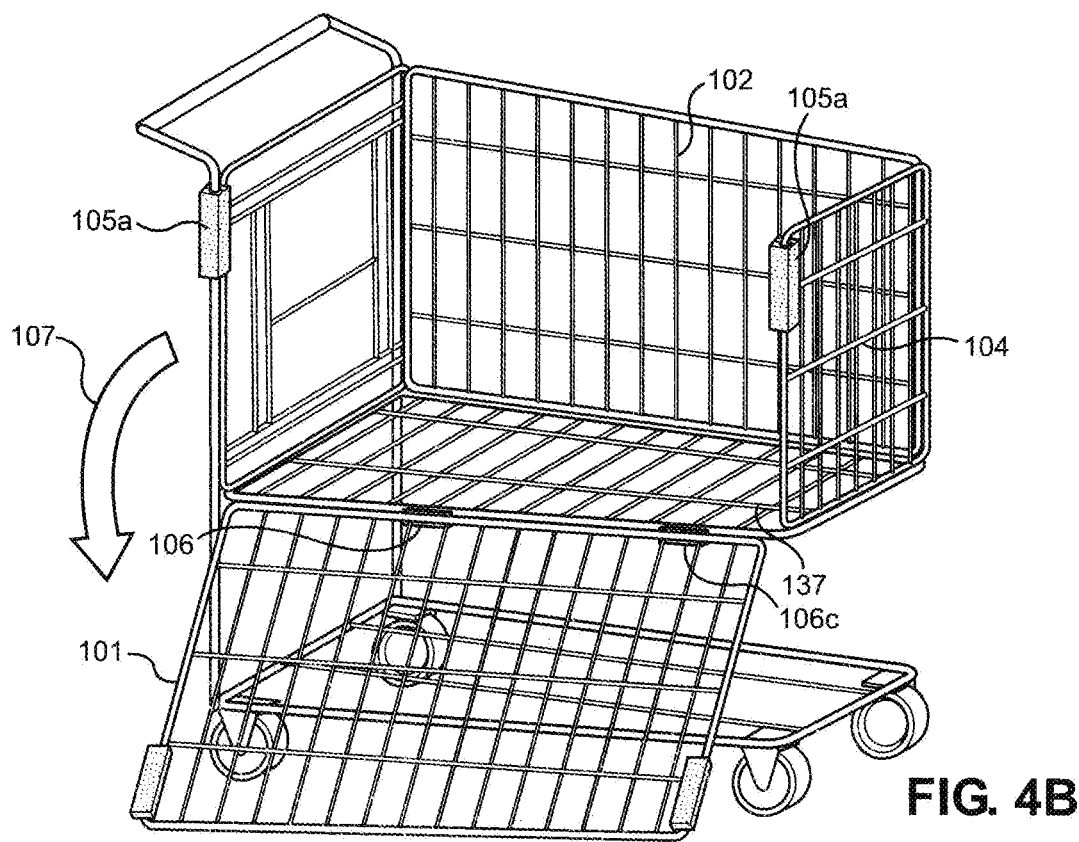
FIG. 4B is a side perspective view of the improved shopping cart with adjustable side panel illustrated in an open position according to an embodiment of the invention.

FIG. 4B illustrates an embodiment whereby the closed loops are replaced by a plurality of lower block magnets 106c horizontally oriented along the outside edge of the cart bed bottom 137 proximate the rotatable side panel 101, 102. In some embodiments, the outside edge of the cart bed bottom 137 itself may be magnetized to facilitate the removable attraction between the cart bed bottom 137 and the rotatable side panel 101, 102.

In this particular embodiment, the rotatable side panel 101, 102 may be removed in its entirety from the cart 100. The rotatable side panel 101, 102 may be repositioned back to its original closed orientation, or may be positioned so that only a single edge of the side panel 101, 102 is attached to the cart 100 as indicated by the position in FIG. 4B.

Figure 4C:
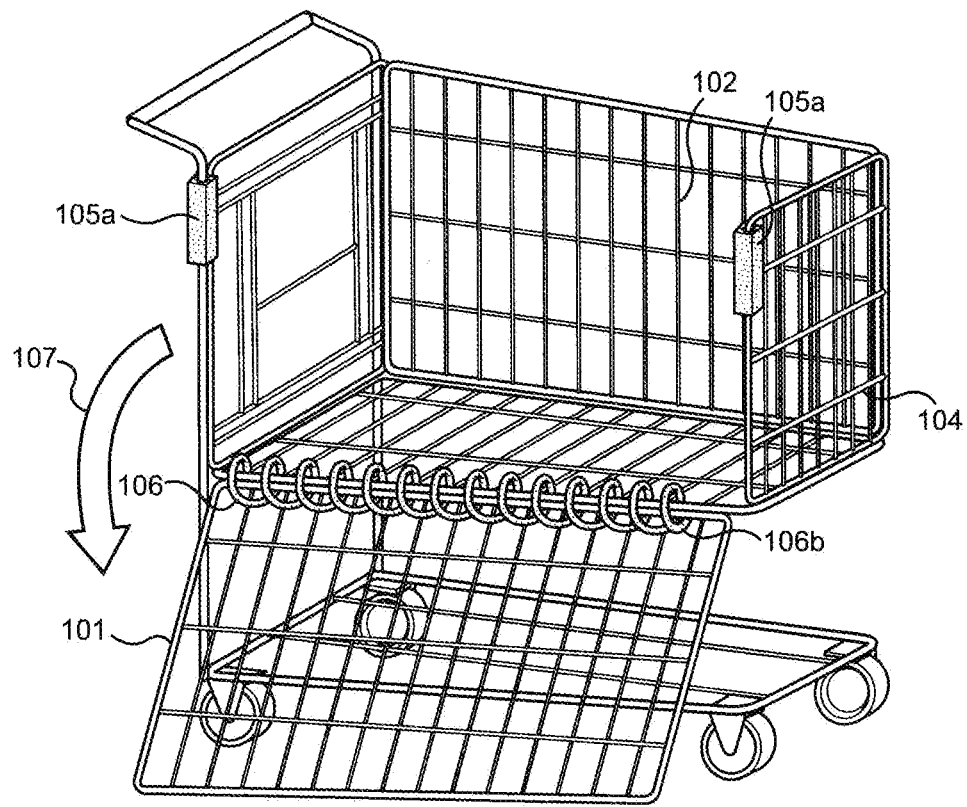
FIG. 4C is a side perspective view of the improved shopping cart with adjustable side panel illustrated in an open position and attached at the panel bottom by a bottom coil according to an embodiment of the invention.

FIG. 4C illustrates an embodiment of the invention whereby the rotation facilitating member 106 may be a coil 106b. The coil 106b may be made of any number of durable and malleable materials that may wrap around a lower frame axis of either side panel 101, 102 and a portion of the edge of the inside bed panel 135 proximate thereto. The coil 106b material may be at least one of spiraled metal, plastic, metal coated with plastic, fiber, a hybrid thereof, and the like.

In this embodiment, the cart 100 may transition from a closed position as depicted in FIG. 4A to an open position when the rotatable side panel 101, 102 is removed from the cart bed top 136 and is swung along the indicated rotational direction 107 via the coil 106b. This may be an arced range of 180 degrees or more below the cart bed bottom 137. In this embodiment, the remaining panels without rotational members 106 may be fixed in non-rotatable positions.

Figure 4D:
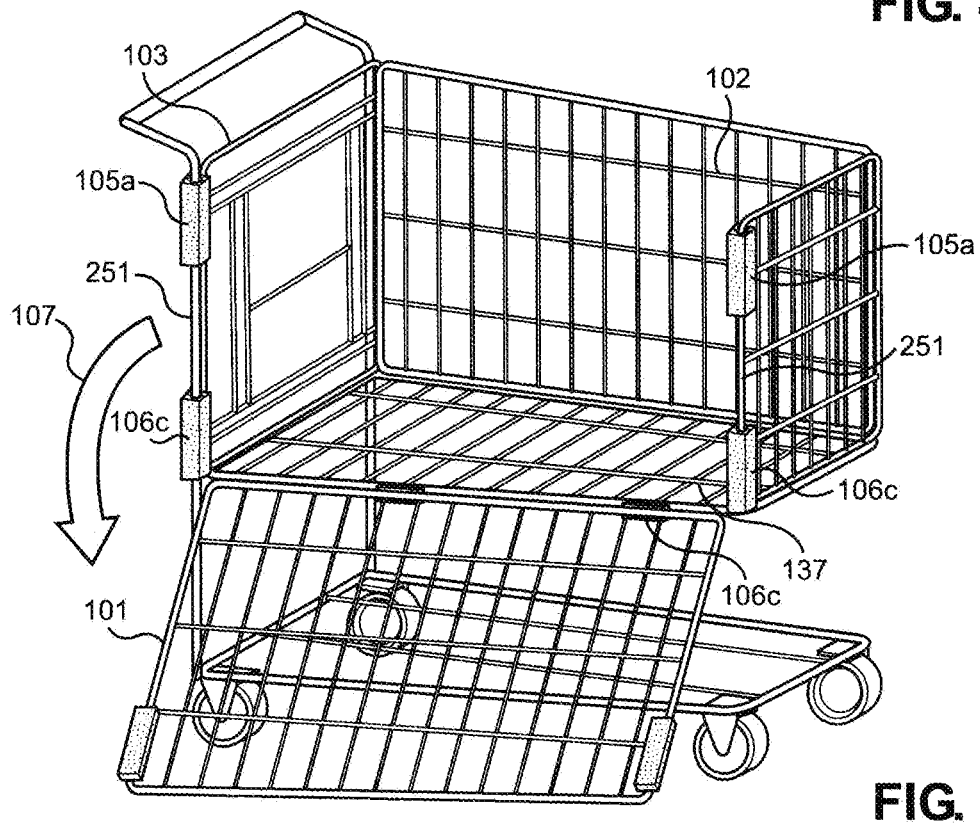
FIG. 4D is a side perspective view of the improved shopping cart with side panel opened from the panel top and attached at the panel bottom by a plurality of magnets according to an embodiment of the invention.

FIG. 4D shows an embodiment similar to FIG. 4B with the addition of lower block magnets 106c vertically oriented at the base of the end panel 103 proximate the cart bed bottom 137 and the base of the front panel 104 proximate the cart bed bottom 137. These may supply additional magnetized support to the rotatable side panel 101, 102. In some embodiments the receiving bars 251 may themselves be permanently magnetized, or replaced with new magnetic rods, instead of using block magnets.

Figure 5A:
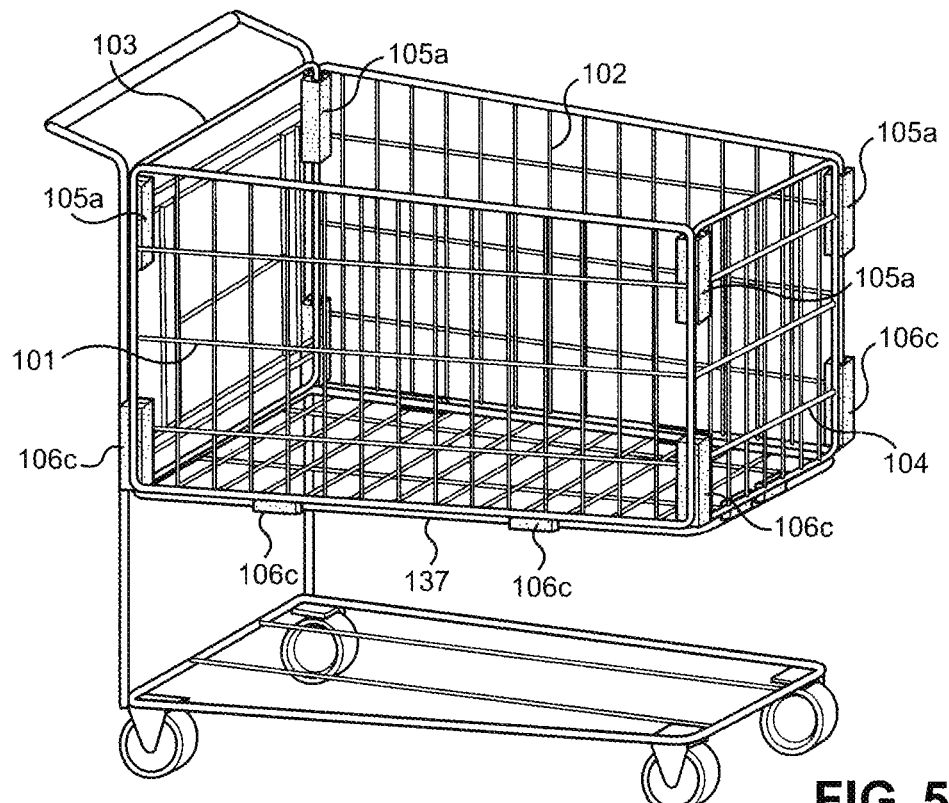
FIG. 5A is a side perspective view of the improved shopping cart with at least three adjustable panels in the closed position according to an embodiment of the invention.

FIG. 5A illustrates an embodiment whereby at least three panels including the first side panel 101, second side panel 102, and the front panel 104 may be rotatable along the respective perimeter of the inside panel 135. As shown, there may be a plurality of lower block magnets 106c horizontally oriented along the inside panel 135 that may removably engage bottom frame portions of the first side panel 101, the second side panel 102, and the front panel 104. At the cart bed top 136 may be upper block magnets 105a vertically oriented along the side edges of the first side panel 101, the second side panel 102, and the front panel 104. More particularly, in some embodiments, the end panel 103 and the front panel 104 may include upper block magnets 105a on either of their respective sides that include flat facing surfaces structured to receive side edges of the first side panel 101 and the second side panel 102. These upper block magnets 105a may removably secure the first side panel 101 and second side panel 102 in their upright positions when needed. Likewise, these upper block magnets 105a may secure the front panel 104 in an upright position when at least one other side panel 101, 102 is secured in an upright position via an upper block magnet 105a on the end panel 103.

Figure 5B:
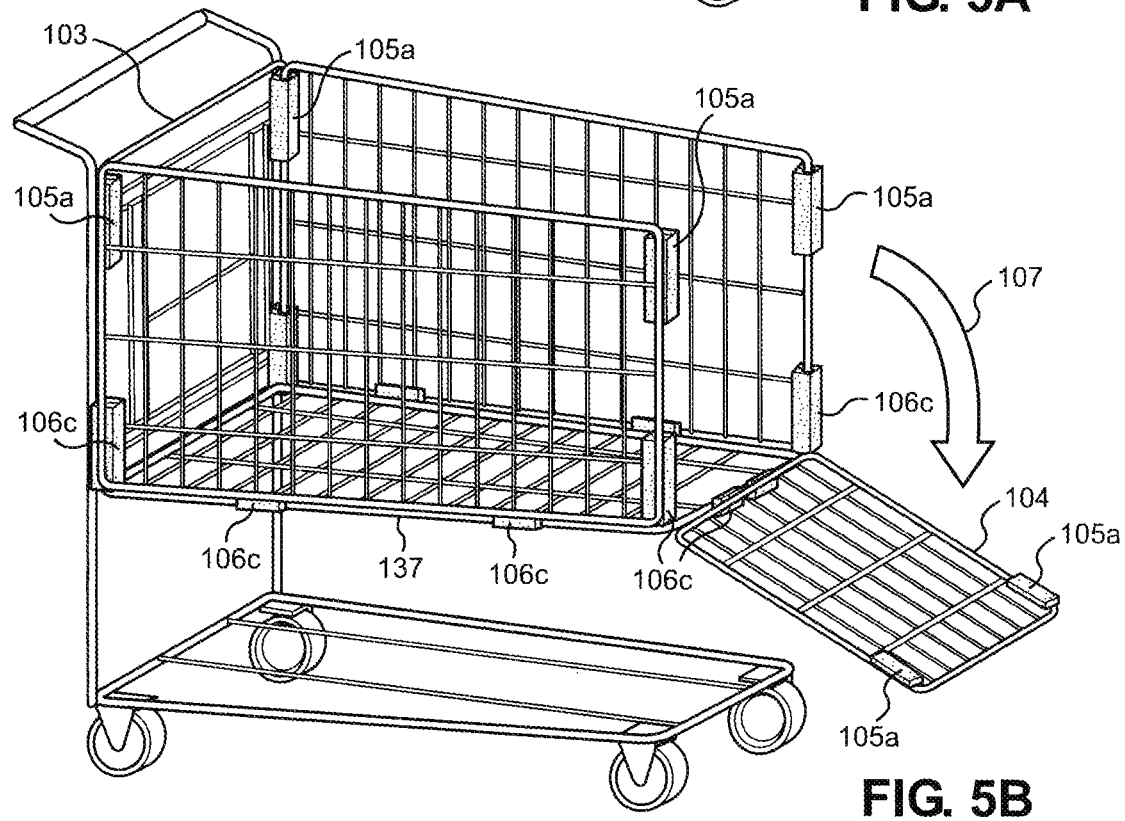
FIG. 5B is a side perspective view of the improved shopping cart with at least three adjustable panels with front panel opened according to an embodiment of the invention.

FIG. 5B further shows that the front panel 104 in this embodiment may be rotated along the horizontally oriented lower block magnets 106c and detached from the upper block magnets 105a to swing the front panel 104 downward while the first and second side panels 101, 102 remain upright. As in the other embodiments, the front panel 104 may be removed from the cart bed top 136 and swung down via the rotation members 106 to an arced range of 180 degrees or more below the cart bed bottom 137.

Figure 5C:
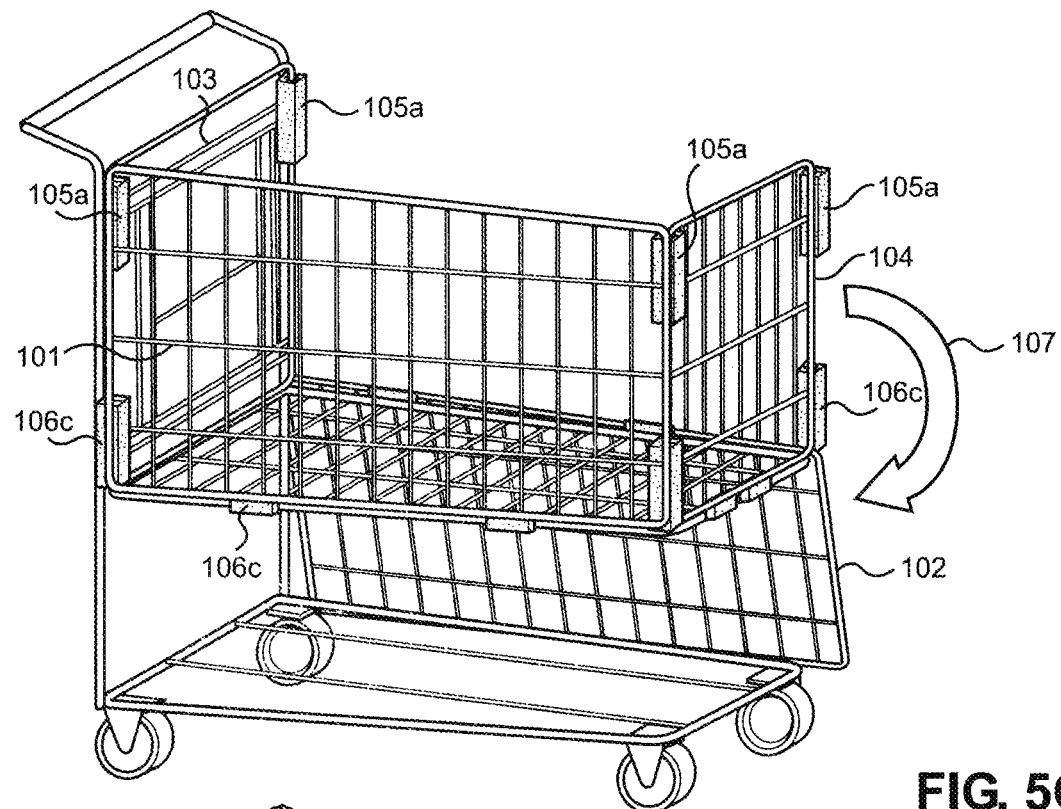
FIG. 5C is a side perspective view of the improved shopping cart with at least three adjustable panels with side panel opened according to an embodiment of the invention.

FIG. 5C illustrates that either side panel 101, 102 is also rotatable along the horizontally oriented lower block magnets 106c and detached from the upper block magnets 105a to swing either side panel 101, 102 downward while the opposing side panel 101, 102 and front panel 104 may remain upright. As in the other embodiments, either side panel 101, 102 may be removed from the cart bed top 136 and swung down via the rotation members 106 to an arced range of 180 degrees or more below the cart bed bottom 137.

Figure 5D:
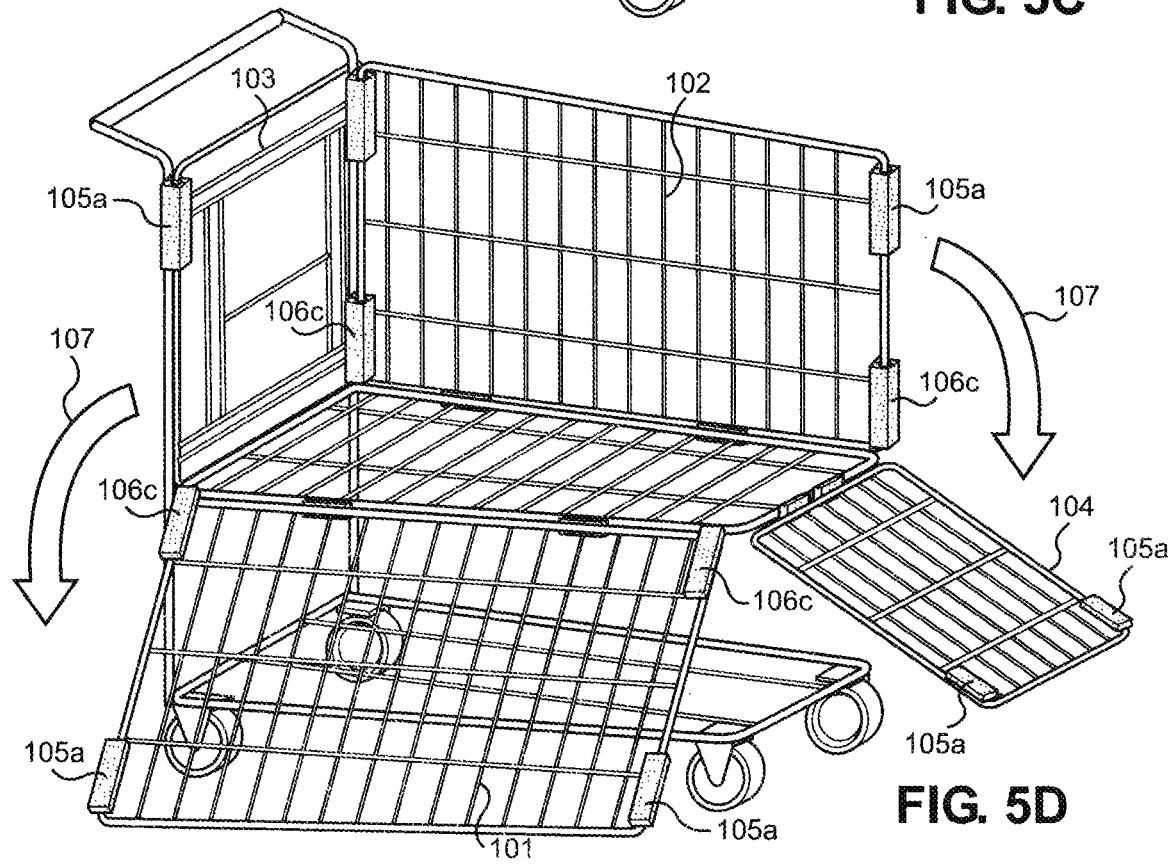
FIG. 5D is a side perspective view of the improved shopping cart with at least three adjustable panels with side panel and front panel opened according to an embodiment of the invention.
Figure 5E:
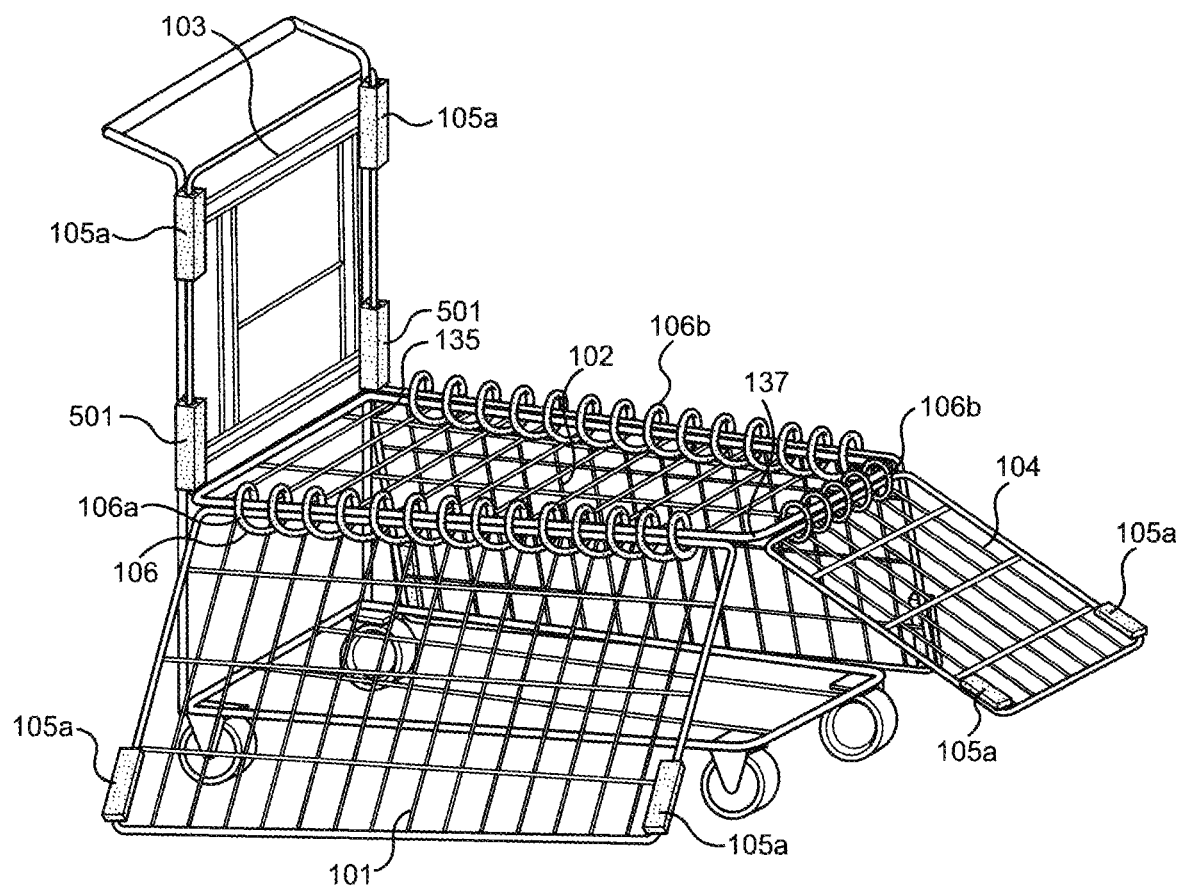
FIG. 5E is a side perspective view of the improved shopping cart with three adjustable panels with all three panels opened according to an embodiment of the invention.

FIG. 5D shows that both a side panel 101, 102 and the front panel 104 may be rotatable at the same time along the horizontally oriented lower block magnets 106c and detached from the upper block magnets 105a to swing either side panel 101, 102 downward while the opposing side panel 101, 102 may remain upright and attached to the end panel 103. As in the other embodiments, either side panel 101, 102 and the front panel 104 may be removed from the cart bed top 136 and swung down via the rotation members 106 to an arced range of 180 degrees or more below the cart bed bottom 137.

FIG, 5E illustrates another embodiment whereby the rotation facilitating members 106 may be coils 106b. The coils 106b may be made of any number of durable and malleable material that may wrap around a lower frame axis of the front panel 104, side panels 101, 102 and the respective edges of the inside bed panel 135 proximate thereto. The coil 106b material may be at least one of spiraled metal, plastic, metal coated with plastic, fiber, a hybrid thereof, and the like.

In this embodiment, the cart 100 may transition from a closed position as depicted in FIG. 5A to an open position when the front panel 104 and both side panels 101, 102 are removed from the cart bed top 136 and swung along the indicated rotational direction 107 via the coil 106b. This may be an arced range of 180 degrees or more below the cart bed bottom 137.

In some embodiments, utilizing the coil 106b there may be upper block magnets 105a at the end top corners of the first and second side panels 101, 102 as well as the top corners of the front panel 104. Furthermore, there may be medial magnets 501 at the front panel 103 along with upper block magnets 105a at the end panel 103 to facilitate a strong and removably secured connection between the side panels 101, 102, the front panel 104 and the end panel 103.

Figure 6A:
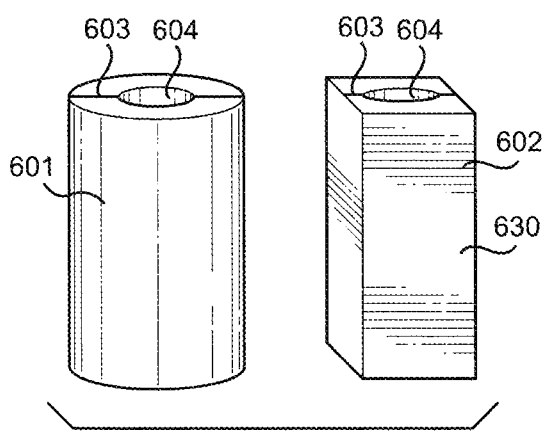
FIG. 6A is a front perspective view of different types of magnets used in the improved shopping cart according to an embodiment of the invention.
Figure 6B:
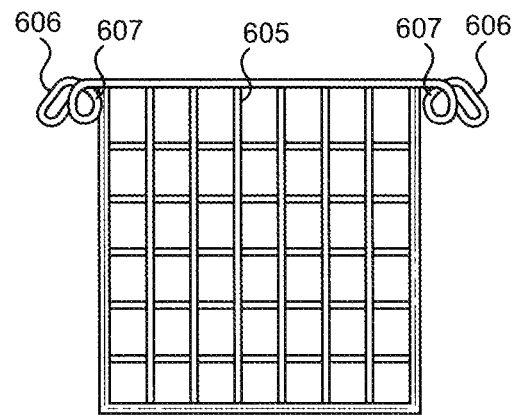
FIG. 6B is a front perspective view of a front panel used in the improved shopping cart according to an embodiment of the invention.

FIGS. 6A through 6E illustrate some of the components that may be used with the improved cart 100. FIG. 6A shows a cylinder magnet 601 with a bar attachment tunnel 604 located through the longitudinal center thereof. Furthermore, the cylinder magnet 601 may be bifurcated along the shown bifurcating line 603 to facilitate the magnet being attachable to a cart 100 that has been constructed before improvement. Furthermore, the bar attachment tunnel 604 may be structured to accommodate the geometric configuration of the cart segment it is to be attached. In some embodiments this may simply be a curved interior tunnel to secure the magnet to a shopping cart bar. In other embodiments, the curved interior tunnel may be supplemented with a perpendicularly oriented tunnel to accommodate the crisscrossed bar structure of cart panels.

Also shown by FIG. 6A is a block magnet 602 that may be used with the improved cart 100. Included in the block magnet 602 may be a bar attachment tunnel 604 located through the longitudinal center thereof. Furthermore, the block magnet 602 may be bifurcated along the shown bifurcating line 603 to facilitate the magnet being attachable to a cart 100 that has been constructed before improvement. Furthermore, the bar attachment tunnel 604 may be structured to accommodate the geometric configuration of the cart segment it is to be attached. Like the cylinder magnet 601, in some embodiments this may simply be a curved interior tunnel to secure the magnet to a shopping cart bar. In other embodiments, the curved interior tunnel may be supplemented with a perpendicularly oriented tunnel to accommodate the crisscrossed bar structure of cart panels. Furthermore, the block magnet 604 may be polygonal with a plurality of flat faces 630 structured to facilitate the engagement of a cart panel thereon.

Fla 6B illustrates an improved front panel 605 that may be associated with an improved cart 100. In this embodiment, the front panel 605 may include a pair of attachment loops 607 at opposing upper corners of the front panel 605. The attachment loops 607 may be circular extensions of the upper edge of the front panel 605 structured to accommodate the horizontally oriented upper edge of the side panels 101, 102. With this improved front panel 605, the existing front panel 104 of the cart 100 can be removed and this improved front panel 605 can be fitted onto the extended upper edge bars that would protrude from the respective end of the cart 100. These attachment loops 607 may act as the upper fastening members 105 in lieu of other fastening members 105 mentioned herein.

Additionally, the improved front panel 104 may include a pair of handle loops 606 at opposing upper corners of the front panel 605 just outside the attachment loops 607. In some embodiments, the handle loops 606 may be circular extensions of the upper edge of the front panel 605 continued from the attachment loops 607. In other embodiments, the handle loops 606 may be separate members soldered or attached by other means to the front panel 104. In any embodiment, the handle loops 606 may be used as a facilitating means to grab and pull the front panel 104 from the top of the cart 100 and rotate it downward to an open position.

Figure 6C:
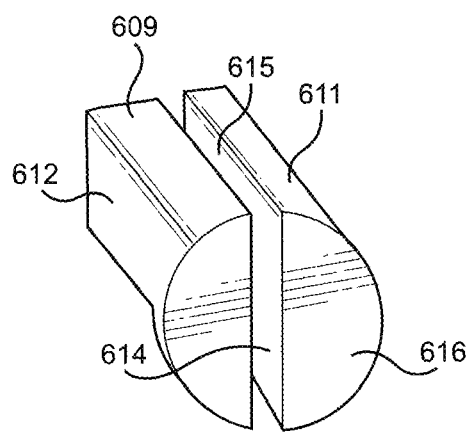
FIG. 6C is a front perspective view of a side clip used in the improved shopping cart according to an embodiment of the invention.

FIG. 6C illustrates the clamp 609 that may be used with the improved cart 100. Like the magnets 601, 602, the clamp 609 may be bifurcated into a first segment 611 and a second segment 612 separated by an attachment channel 615 to facilitate the clamp 609 being attachable to a cart 100 that has been constructed before improvement. Furthermore, the attachment channel 615 may be structured to accommodate the geometric configuration of the cart segment it is to be attached. Like the magnets 601, 602 in some embodiments this may simply be a curved interior tunnel to secure the clamp 609 to a shopping cart bar. In other embodiments, the attachment channel 615 may be supplemented with a perpendicularly oriented tunnel to accommodate the crisscrossed bar structure of cart panels. In any embodiment, the front face 616 of the clamp 609 may be structured to accommodate a vertically oriented front panel bar to removably secure the front panel 104 to the cart 100.

Figure 6D:
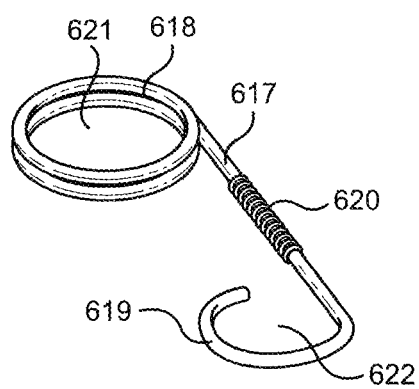
FIG. 6D is a front perspective view of a closing latch hook used in the improved shopping cart according to an embodiment of the invention.

FIG. 6D shows a receiving hook 617 that may be used with the improved cart 100. Similar to the clamp 609, the receiving hook 617 may be structured to accommodate a vertically oriented front panel bar to removably secure the front panel 104 to the cart 100. The receiving hook 617 may include a closed attachment end 618, which may be a circular end structured to accommodate a vertically oriented side panel and fixedly attach the receiving hook 617 thereto. The opposing end of the receiving hook 617 may be a curved open end 619 structured to receive and removably secure an front panel 104 to a side panel 101, 102. An elongate flexible medial member 620 may be bendable. This may allow the receiving hook 617 to stretch to expose the curved open end to allow an front panel 104 to be ensnared by the panel receiving area 622 or allow for the receiving hook 617 to release the front panel 104. In any embodiment, the receiving hook 617 may be structured to accommodate a vertically oriented front panel bar to removably secure the front panel 104 to the cart 100.

Figure 6E:
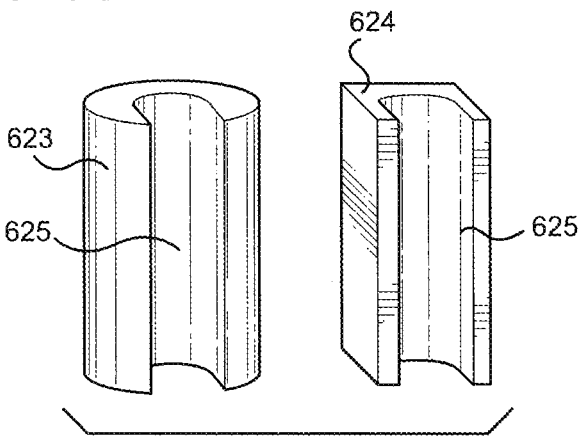
FIG. 6E is a front perspective view of different types of magnets used in the improved shopping cart according to an embodiment of the invention.

FIG. 6E illustrates different types of magnets that may be used with the improved cart 100. These magnets may include semicylindrical magnets 623 with a bar attachment channel and a semi-block magnet 624 with a bar attachment channel 625. These magnets 623, 624 may be structured to easily fit on the bars of a cart 100. Therefore, these magnets may be used to easily convert a traditional shopping cart to an improved cart 100.

Figure 7:
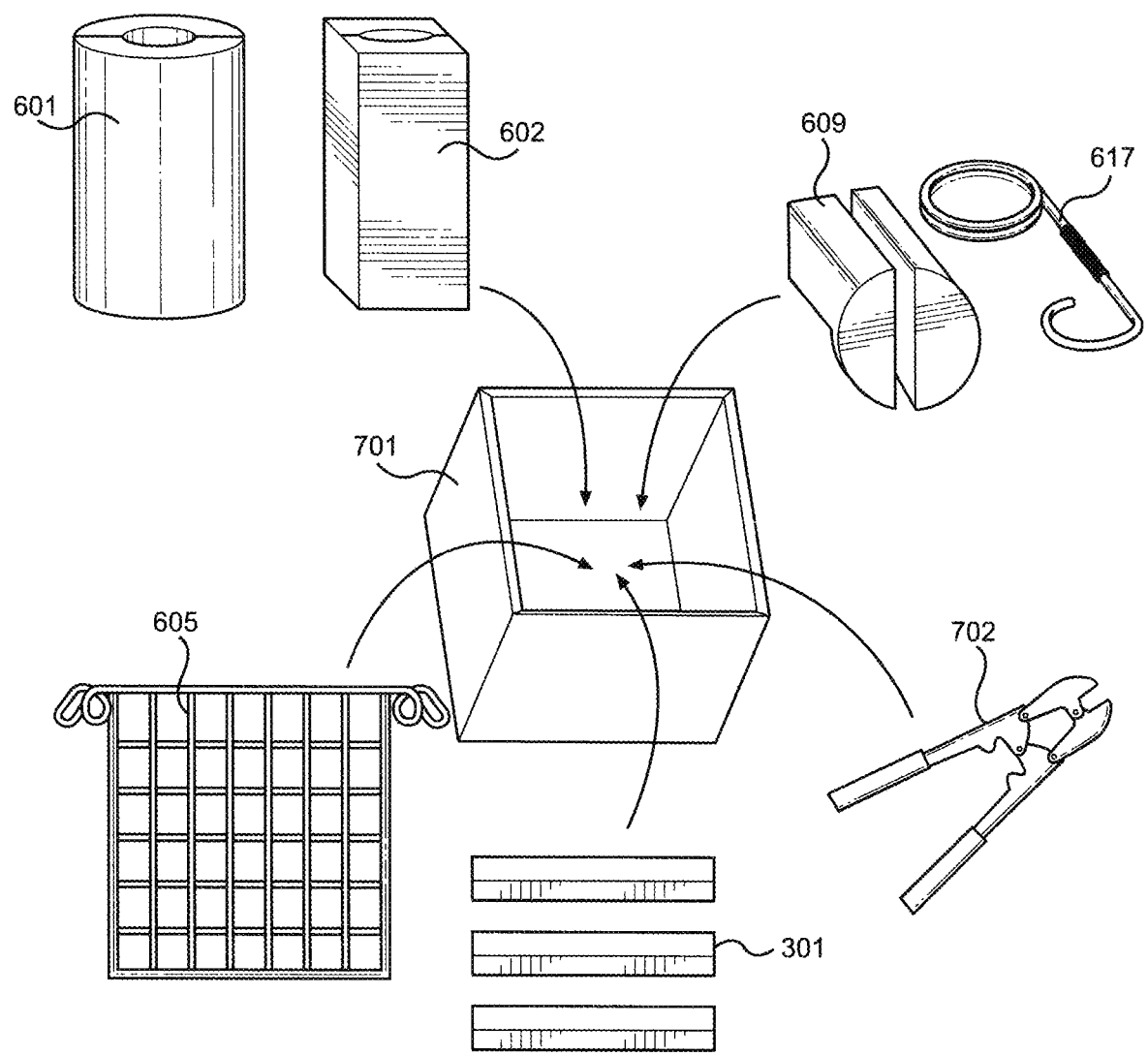
FIG. 7 is a top perspective view of an improvement kit used to transform a shopping cart according to an embodiment of the invention.

FIG. 7 shows an improvement kit 700 that may be used to convert a traditional cart into an improved cart 100. An improvement kit 700 may come with all or some of the listed components as well as other components listed within this application. As shown, the kit may include a container 701 structured to accommodate a plurality of magnets. The magnets may be of the cylindrical, block, semicylindrical, and/or semi- block variety. Furthermore, the improvement kit 700 may include one or more receiving members such as a clamp 609 and receiving hook 617. Additionally, the improvement kit may include an improved front panel 605, magnetized panes 301 and a panel removal device such as bolt cutters 702 or blow torch.

Figure 8:
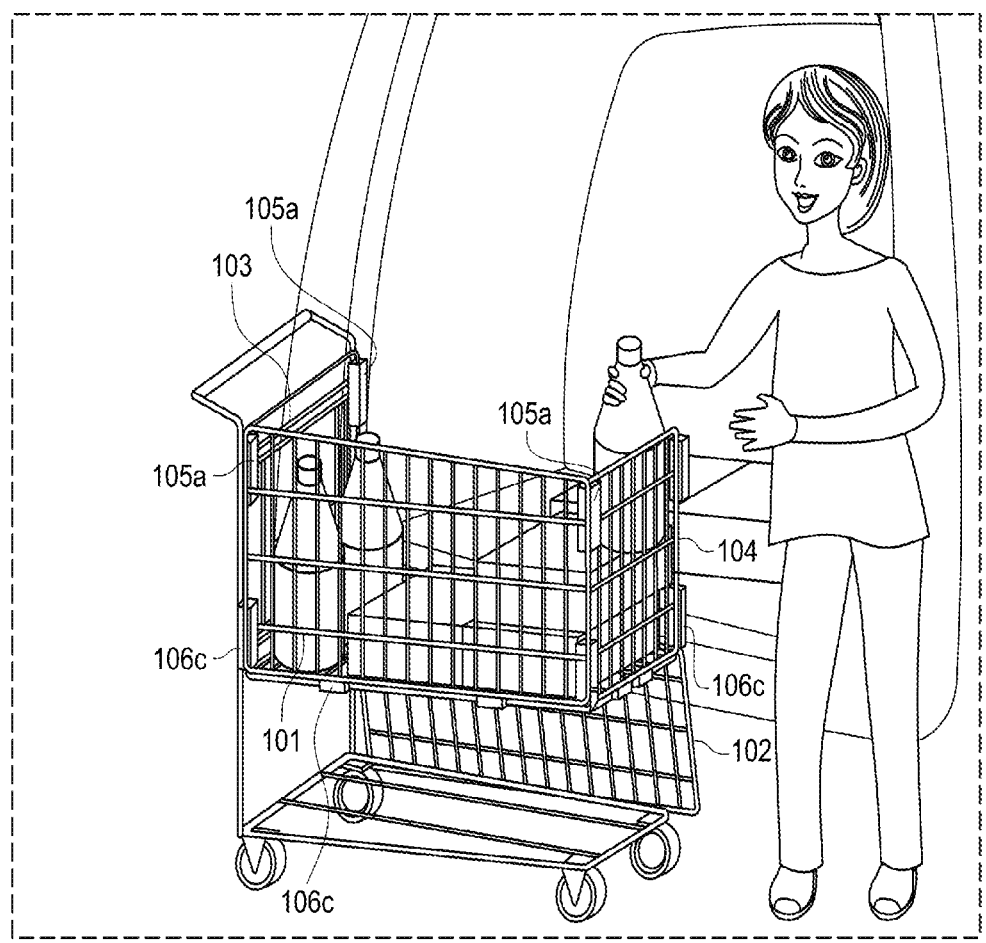
FIG. 8 shows the side panel rotated downward in an open position to permit the cart to be positioned to the edge of the trunk of a vehicle to facilitate the unloading of heavy or supersized goods from the cart by sliding the goods in lieu of liftin the goods.

FIG. 8 shows the side panel 101 rotated downward in an open position to permit the cart 100 to be positioned to the edge of the trunk of a vehicle to facilitate the unloading of goods from the cart by sliding the goods in lieu of lifting the goods. The loading and unloading of heavy items becomes an issue for elderly and fragile segments of the population that may not be able to hoist the goods out from the overtop of the shopping cart panel. By way of a non-limiting examples, the trunk of the vehicle in FIG. 8 may be exchanged with surfaces such as a kitchen pantry, warehouse shelves, and containers, to load and unload heavy or super-sized items to and from the improved shopping cart.

It should be noted that while some embodiments of the improved cart 100 show specific attachment and rotation components such as block magnets or hinges, many of the components may be interchanged in a variety of combinations to carry out the purpose of the invention. By way of non-limiting example, in FIGS. 1A-D, the block magnets may be exchanged with cylinder magnets in some embodiments. Furthermore, in other embodiments the hinges may be exchanged with slide bolt latches. Also, the bottom magnets in FIGS. 5A-5E may in some embodiments be closed loops, hinges or the like. Likewise, a combination of any of the components may be mixed to create a unique and improved shopping cart 100 as contemplated and described within the scope of this application. Furthermore, the front panel 104 may be a new panel or a panel that has been cut out off of an existing shopping cart and removably attached to the cart bed top 136 via a plurality of fastening members 105. Some embodiments include the improved cart as a flat bed shopping cart with up to three downwardly foldable panels.

That which is claimed is:

1. An improved shopping cart that includes a first side panel, a second side panel, a front panel and end panel, wherein at least one of the first side panel and second side panel are fixed; and wherein the end panel is fixed; and
   wherein at least one of the first side panel and second side panel are rotatable by at least one of bottom magnets, a bottom coil, bottom hinges, and bottom closed loops fixed on a bottom frame of the improved shopping cart; and
   wherein the at least one of the first side panel and second side panel are removably attached via upper flat facing magnets.

2. Te An improved shopping cart comprising a first side panel, a second side panel, a front panel and end panel;
   a plurality of fastening members attached to the outer frame of the first side panel, second side panel, front panel and end panel; and
   a plurality of rotation facilitating members attached to the bottom frame of the improved shopping cart;
   wherein the first side panel, second side panel, and end panel are removably attached to at least one of the first side panel, second side panel, front panel, and end panel via magnets fixedly attached to an upper portion of the first side panel, second side panel, front panel, and end panel;
   wherein at least one of the first side panel, second side panel, and end panel are rotatable along bottom rotational members.

3. The improved shopping cart of claim 2 wherein the upper magnets are fixed to vertical side ends of the first side panel, second side panel, front panel, and end panel; and
   wherein the upper magnets are configured with a plurality of flat face surfaces to accommodate removably attaching the first side panel, second side panel and end panel respectively.

4. The improved shopping cart of claim 2 wherein the rotation facilitating members are comprised of at least one of bottom magnets, a bottom coil, bottom hinges, and bottom closed loops on a bottom frame of the improved shopping cart.

5. The improved shopping cart of claim 2 wherein the front panel, the side panel may be rotated downward to an open position.

6. The improved shopping cart of claim 2 wherein the improved shopping cart does not interfere with the nesting of other shopping carts.

\* \* \* \* \*